(12) United States Patent
Fukuyama et al.

(10) Patent No.: US 10,527,061 B2
(45) Date of Patent: Jan. 7, 2020

(54) CENTRIFUGAL COMPRESSOR

(71) Applicant: KABUSHIKI KAISHA TOYOTA JIDOSHOKKI, Kariya-shi, Aichi-ken (JP)

(72) Inventors: Ryosuke Fukuyama, Kariya (JP); Shogo Ito, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 201 days.

(21) Appl. No.: 15/462,293

(22) Filed: Mar. 17, 2017

(65) Prior Publication Data

US 2017/0288241 A1 Oct. 5, 2017

(30) Foreign Application Priority Data

Mar. 31, 2016 (JP) ................. 2016-072933

(51) Int. Cl.
| | |
|---|---|
| *F04D 29/58* | (2006.01) |
| *F04D 29/40* | (2006.01) |
| *F04D 29/42* | (2006.01) |
| *F04D 29/44* | (2006.01) |
| *H01M 8/04111* | (2016.01) |
| *F04D 25/06* | (2006.01) |
| *F04D 17/10* | (2006.01) |

(52) U.S. Cl.
CPC ....... *F04D 29/5846* (2013.01); *F04D 29/403* (2013.01); *F04D 29/4213* (2013.01); *F04D 29/441* (2013.01); *H01M 8/04111* (2013.01); *F04D 17/10* (2013.01); *F04D 25/06* (2013.01); *H01M 2250/20* (2013.01); *Y02T 90/32* (2013.01)

(58) Field of Classification Search
CPC ......... H01M 8/04111; H01M 8/04029; H01M 2250/20; H02J 3/387; F04D 25/06; F04D 29/4213; F04D 29/441; F04D 17/10; F04D 29/4293; F04D 29/5846; F04D 29/403; Y02T 90/32
See application file for complete search history.

(56) References Cited

U.S. PATENT DOCUMENTS 5,975,845 A * 11/1999 Ball ................. F01D 11/02
415/173.4
6,601,672 B2 * 8/2003 Liu .................... F04D 29/4213
181/213

(Continued)

FOREIGN PATENT DOCUMENTS

| JP | 5-19598 | 3/1993 |
|---|---|---|
| JP | 2000-205199 | 7/2000 |

(Continued)

*Primary Examiner* — Nathan C Zollinger
(74) *Attorney, Agent, or Firm* — Greenblum & Bernstein, P.L.C.

(57) ABSTRACT

A centrifugal compressor includes a housing that accommodates an impeller. The housing includes a motor housing, a speed-increasing gear housing, and a compressor housing. The compressor housing has a suction port through which air is drawn in. The compressor housing includes a cylindrical main body, a cylindrical boss, and a fitting portion having a shape of a truncated cone. The cylindrical boss projects from the main body. The boss includes an injection port for spraying water that is generated through power generation by a fuel cell to air flowing through the suction port toward an impeller chamber.

3 Claims, 1 Drawing Sheet

(56) References Cited

U.S. PATENT DOCUMENTS

2015/0079486 A1* 3/2015 Lee .................. H01M 8/04089
                                                                                         429/410
2016/0036074 A1* 2/2016 Kim .................. H01M 8/04291
                                                                                         429/414

FOREIGN PATENT DOCUMENTS

| JP | 2004-308757 | 11/2004 |
| JP | 2008-309005 | 12/2008 |
| JP | 2010-48160 | 3/2010 |

* cited by examiner

CENTRIFUGAL COMPRESSOR

BACKGROUND OF THE INVENTION

The present invention relates to a centrifugal compressor.

As disclosed in Japanese Laid-Open Patent Publication No. 2004-308757, conventionally, centrifugal compressors that include a rotary shaft and an impeller coupled to the rotary shaft have been known. Such a centrifugal compressor compresses fluid by rotation of the impeller and discharges the compressed fluid.

When fluid is compressed, the temperature of the fluid is increased. Centrifugal compressors are also used to supply air to a fuel cell. In this case, the temperature of air discharged from a centrifugal compressor may be increased excessively, and the fuel cell may deteriorate.

SUMMARY OF THE INVENTION

Accordingly, it is an objective of the present invention to provide a centrifugal compressor that decreases the temperature of air to be discharged.

To achieve the foregoing objective and in accordance with a first aspect of the present invention, a centrifugal compressor that supplies air to a fuel cell is provided. The centrifugal compressor includes an impeller including blades and a housing accommodating the impeller. The housing includes a suction port through which air is drawn in, an impeller chamber accommodating the impeller, and an introduction chamber that connects the suction port to the impeller chamber and introduces air to the impeller chamber. The housing includes an introduction chamber defining portion that defines the introduction chamber. The introduction chamber defining portion includes an injection port through which water is sprayed to air flowing through the suction port toward the impeller chamber.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figures 1A, 1B, 1C:
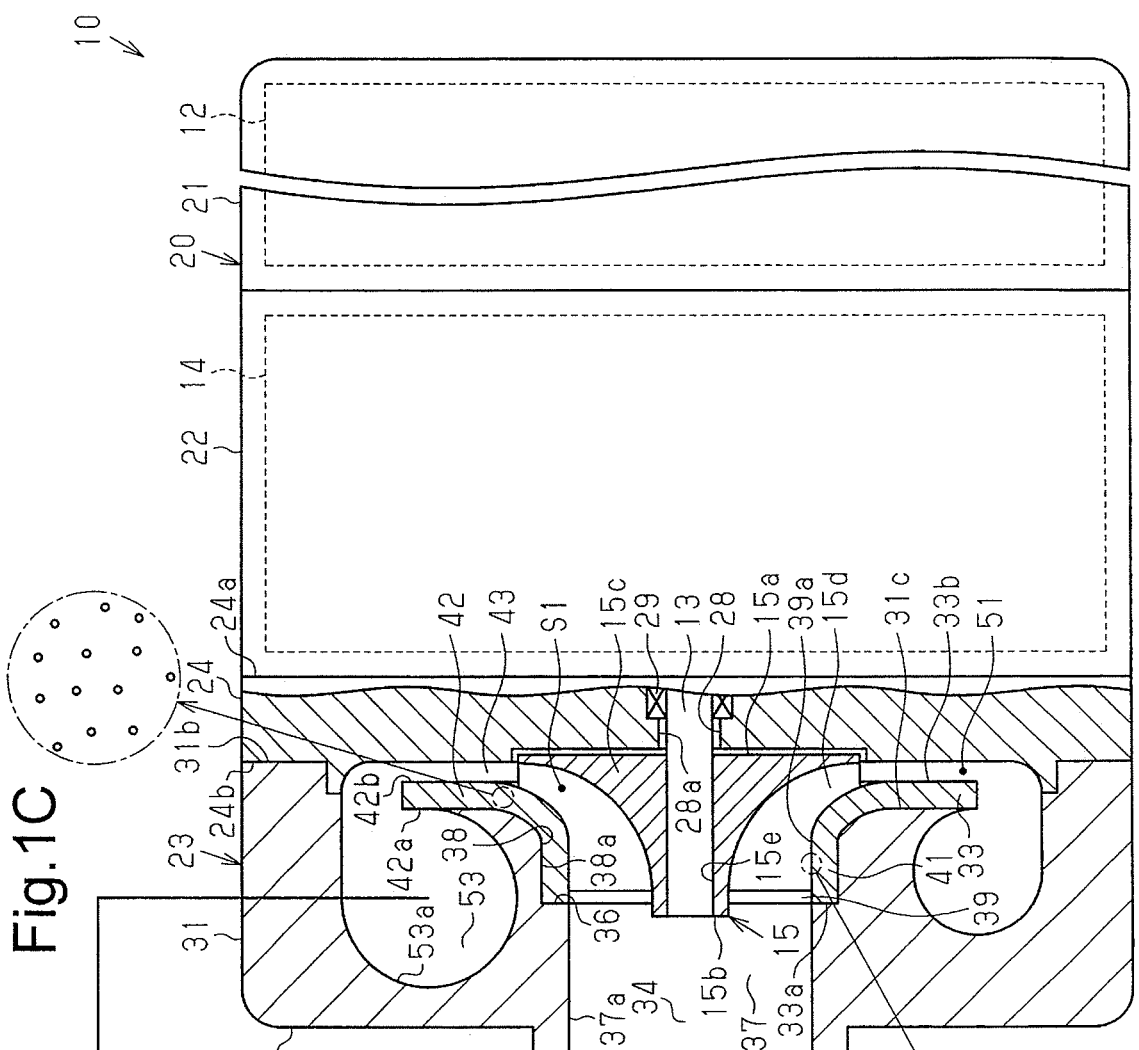
FIG. 1A is a schematic diagram, with a part cut away, illustrating a centrifugal compressor according to one embodiment of the present invention.
FIG. 1B is an enlarged partial cross-sectional view of a clearance between the blades of the impeller and the inner surface of the fitting portion.
FIG. 1C is an enlarged partial cross-sectional view of the fitting portion.

A centrifugal compressor according to one embodiment of the present invention will now be described. The centrifugal compressor is mounted on a fuel cell vehicle that travels with a fuel cell serving as a power source. The centrifugal compressor supplies air to the fuel cell.

As shown in FIG. 1A, the centrifugal compressor 10 includes an electric motor 12, a speed-increasing gear 14, and an impeller 15. The electric motor 12 rotates a non-illustrated low-speed shaft. The speed-increasing gear 14 accelerates rotation of the low-speed shaft and transmits the rotation to a high-speed shaft 13. The impeller 15 compresses air by rotation of the high-speed shaft 13.

The centrifugal compressor 10 includes a housing 20. The housing 20 defines the outline of the centrifugal compressor 10. The housing 20 accommodates the electric motor 12, the speed-increasing gear 14, and the impeller 15. The housing 20 has a substantially cylindrical shape as a whole, or more specifically, the housing 20 is shaped as a circular cylinder.

The housing 20 includes a motor housing 21, a speed-increasing gear housing 22, and a compressor housing 23. The motor housing 21 accommodates the electric motor 12. The speed-increasing gear housing 22 accommodates the speed-increasing gear 14. The compressor housing 23 includes a suction port 23a that draws in air. The suction port 23a is located at one end of the housing 20 in the axial direction. The compressor housing 23, the speed-increasing gear housing 22, and the motor housing 21 are arranged in order from the suction port 23a in the axial direction of the housing 20. The housing 20 also includes a plate 24 that is located between the speed-increasing gear housing 22 and the compressor housing 23. The motor housing 21, the speed-increasing gear housing 22, and the plate 24 are made of metal such as aluminum.

The plate 24 is disk shaped. The plate 24 includes a pair of first and second plate surfaces 24a, 24b oriented in the axial direction. The first plate surface 24a faces the speed-increasing gear housing 22, and the second plate surface 24b faces the compressor housing 23.

The plate 24 includes a rotary shaft insertion hole 28. The rotary shaft insertion hole 28 extends through the plate 24 in the axial direction. The rotary shaft insertion hole 28 connects the inside of the speed-increasing gear housing 22 to the inside of the compressor housing 23. The high-speed shaft 13 is inserted in the rotary shaft insertion hole 28. Part of the high-speed shaft 13 projects from the rotary shaft insertion hole 28 into the compressor housing 23.

The axial direction of the plate 24 matches with the direction in which the rotation axis of the high-speed shaft 13 extends. A sealing member 29 is located between an inner circumferential surface 28a of the rotary shaft insertion hole 28 and the circumferential surface of the high-speed shaft 13. The sealing member 29 restricts oil in the speed-increasing gear housing 22 from flowing into the compressor housing 23.

The compressor housing 23 is substantially cylindrical. The compressor housing 23 includes a cylindrical main body 31, a cylindrical boss 32, and a fitting portion 33 having a shape of a truncated cone. The cylindrical boss 32 projects from the main body 31. The compressor housing 23 includes a pair of end surfaces oriented in the axial direction. One of the end surfaces is a first end surface 31a, and the other end surface is a second end surface 31b. The axial direction of the compressor housing 23, the main body 31, and the fitting portion 33 matches with the direction in which the rotation axis of the high-speed shaft 13 extends. The radial direction of the compressor housing 23, the main body 31, and the fitting portion 33 also matches with the radial direction of the high-speed shaft 13.

The compressor housing 23 includes a compressor through-hole 40, an annular groove 43, and an annular hole 53. The compressor through-hole 40 extends through the compressor housing 23 in the axial direction. The annular groove 43 opens in the second end surface 31b and communicates with the compressor through-hole 40. The annular hole 53 opens in the second end surface 31b and communicates with the annular groove 43.

The annular groove 43 is located radially outward of the compressor housing 23 from the compressor through-hole 40 and functions as a diffuser passage 51. The annular hole 53 is located radially outward of the compressor housing 23 from the annular groove 43 and functions as a discharge chamber.

The main body 31 is substantially cylindrical. The main body 31 includes a pair of end surfaces oriented in the axial direction. One of the end surfaces is the first end surface 31a of the compressor housing 23, and the other end surface is the second end surface 31b of the compressor housing 23. The main body 31 includes a through-hole 34, the annular hole 53, and an annular groove 31c. The annular groove 31c connects the through-hole 34 to the annular hole 53. The through-hole 34 extends from the first end surface 31a toward the second end surface 31b. The diameter of the through-hole 34 is constant from the first end surface 31a and partway in the axial direction and increases toward the second end surface 31b. A step is provided at the position where the diameter of the through-hole 34 is increased.

More specifically, the through-hole 34 is constituted by a first through-hole defining surface 37a, a second through-hole defining surface 38a, and an annular flat surface 36. The first through-hole defining surface 37a defines a first through-hole 37 in the vicinity of the first end surface 31a. The second through-hole defining surface 38a defines a second through-hole 38 in the vicinity of the second end surface 31b. The flat surface 36 extends in the radial direction and connects the first through-hole defining surface 37a to the second through-hole defining surface 38a. The diameter of the first through-hole 37 is constant regardless of the position in the axial direction of the main body 31. The diameter of the second through-hole 38 is constant from the flat surface 36 and partway in the axial direction toward the second end surface 31b. The diameter of the second through-hole 38 gradually increases toward the second end surface 31b from the position that is partway in the axial direction. The diameter of the second through-hole 38 is greater than the diameter of the first through-hole 37 along the entire second through-hole 38. The second through-hole defining surface 38a is flush with the surface defining the annular groove 31c.

The boss 32 projects from the first end surface 31a of the main body 31. The boss 32 is located at the peripheral portion of the through-hole 34. The boss 32 is cylindrical and includes a boss through-hole 35. The boss through-hole 35 communicates with the through-hole 34. The boss 32 includes a pair of end portions oriented in the axial direction. The suction port 23a is located at the end portion of the boss 32 that is further from the main body 31. The suction port 23a communicates with the through-hole 34 via the boss through-hole 35. The boss 32 includes an injection port 32a. The injection port 32a extends through the boss 32 in the radial direction and communicates with the boss through-hole 35. The main body 31 and the boss 32 are made of metal such as aluminum. The axial direction of the boss 32 matches with the direction in which the rotation axis of the high-speed shaft 13 extends, and the radial direction of the boss 32 matches with the radial direction of the high-speed shaft 13.

The fitting portion 33 includes a pair of end surfaces oriented in the axial direction. One of the end surfaces is a first end surface 33a, and the other end surface is a second end surface 33b. The fitting portion 33 extends from the first end surface 33a toward the second end surface 33b and has a constant diameter partway in the axial direction. The fitting portion 33 has a diameter that gradually increases toward the second end surface 33b from the position that is partway in the axial direction. The fitting portion 33 extends in the radial direction from the end of the section of gradual diameter increase. In other words, the fitting portion 33 has a shape of a truncated cone. The fitting portion 33 includes a diameter increasing portion 41 and an annular extended portion 42. The diameter increasing portion 41 extends from the first end surface 33a toward the second end surface 33b and has a constant diameter until the position that is partway in the axial direction and a diameter that gradually increases toward the second end surface 33b from the position that is partway in the axial direction. The extended portion 42 extends radially outward from the diameter increasing portion 41. The outer circumferential surface of the diameter increasing portion 41 has the same shape as the surface that defines the second through-hole defining surface 38a and the annular groove 31c. The diameter increasing portion 41 has a diameter that is the same as or slightly smaller than the diameter of the second through-hole 38. This configuration allows the fitting portion 33 to be fitted in the second through-hole 38. The extended portion 42 includes a pair of end surfaces oriented in the axial direction. One of the end surfaces is a first end surface 42a, and the other end surface is a second end surface 42b. The second end surface 42b of the extended portion 42 is the second end surface 33b of the fitting portion 33.

The fitting portion 33 includes a fitting portion through-hole 39. The fitting portion through-hole 39 extends through the fitting portion 33 in the axial direction. The fitting portion through-hole 39 is located at the diameter increasing portion 41. A surface 39a that defines the fitting portion through-hole 39 has the same shape as the outer circumferential surface of the diameter increasing portion 41.

The fitting portion 33 is fitted to the main body 31 with the first end surface 33a abutting against the flat surface 36, the outer circumferential surface of the diameter increasing portion 41 abutting against the second through-hole defining surface 38a, and the first end surface 42a of the extended portion 42 abutting against the surface defining the annular groove 31c. The first through-hole defining surface 37a, the surface 39a, which defines the fitting portion through-hole 39, and the second end surface 42b of the extended portion 42 (the second end surface 33b of the fitting portion 33) are flush with each other. The compressor through-hole 40 is constituted by the first through-hole 37 and the fitting portion through-hole 39.

The compressor housing 23 and the plate 24 are assembled with the second end surface 31b of the main body 31 abutting against the second plate surface 24b of the plate 24. The fitting portion 33 and the plate 24 define an impeller chamber S1. The impeller chamber S1 accommodates the impeller 15. The boss through-hole 35 and the first through-hole 37 connect the suction port 23a to the impeller chamber S1 and form an introduction chamber S2. The introduction chamber S2 introduces air drawn in through the suction port 23a to the impeller chamber S1. In this specification, the boss 32 and the main body 31 form an introduction chamber defining portion.

The impeller 15 includes blades 15d and an impeller main body 15c having a shape of a truncated cone. The blades 15d are provided on the outer circumferential surface of the impeller main body 15c. The diameter of the impeller main body 15c gradually decreases from a proximal end surface 15a to a distal end surface 15b. The impeller main body 15c extends in the direction of the rotation axis of the impeller 15 and includes an insertion hole 15e. The insertion hole 15e accepts the high-speed shaft 13. The projecting portion of the high-speed shaft 13 that projects in the compressor through-hole 40 is inserted in the insertion hole 15e of the impeller 15. Since the impeller 15 is mounted on the high-speed shaft 13 in this state, the impeller 15 is rotational integrally with the high-speed shaft 13. When the impeller 15 is rotated with the high-speed shaft 13, the air drawn in through the suction port 23a is compressed.

As shown in FIG. 1B, the inner circumferential surface of the fitting portion 33 that defines the impeller chamber S1 (the surface 39a that defines the fitting portion through-hole 39) and the blades 15d face each other with a clearance C in between. The clearance C is provided to allow rotation of the impeller 15 in the impeller chamber S1.

As shown in FIG. 1C, the fitting portion 33 is made of porous material. The porous material includes, for example, a sintered material. The porous material includes multiple minute holes and is capable of absorbing liquid by capillary action. Since the fitting portion 33 is made of porous material, an impeller chamber defining portion, which is the fitting portion 33 in this embodiment, serves as a porous portion as a whole. This configuration provides an annular porous portion that surrounds the impeller 15.

As shown in FIG. 1A, the centrifugal compressor 10 includes the diffuser passage 51, into which the air that has been compressed by the impeller 15 flows, and the discharge chamber, into which the fluid that has passed through the diffuser passage 51 flows. The discharge chamber is the annular hole 53 in this embodiment. The diffuser passage 51 is defined by the extended portion 42 of the fitting portion 33 and the plate 24, and more specifically, by the second end surface 42b of the extended portion 42 and the second plate surface 24b of the plate 24.

The diffuser passage 51 is located radially outward of the high-speed shaft 13 from the impeller chamber S1. The diffuser passage 51 has a loop shape that surrounds the impeller 15 and the impeller chamber S1. More specifically, the diffuser passage 51 is annular.

The discharge chamber is located radially outward of the through-hole 34 of the main body 31. The discharge chamber is defined by an inner surface 53a of the annular hole 53, which opens in the second end surface 31b of the compressor housing 23. The annular hole 53 communicates with the impeller chamber S1 via the diffuser passage 51. Fluid is compressed by the impeller 15, flows through the diffuser passage 51 to be further compressed, and flows into the annular hole 53. Subsequently, the fluid is discharged from the annular hole 53.

The fuel cell vehicle on which the above-described centrifugal compressor 10 is mounted will now be described.

The fuel cell vehicle includes a fuel cell 71, the centrifugal compressor 10, a gas-liquid separator 72, and a tank 73. The centrifugal compressor 10 supplies air to the fuel cell 71. The gas-liquid separator 72 separates off-gas generated through power generation by the fuel cell 71 into water and gas. The tank 73 stores water separated from the off-gas by the gas-liquid separator 72.

The fuel cell 71 generates power through a chemical reaction between hydrogen gas supplied from a non-illustrated hydrogen tank and air discharged from the annular hole 53 of the centrifugal compressor 10. The fuel cell vehicle runs on a non-illustrated traction motor that is driven with the fuel cell 71 serving as a power source.

The fuel cell vehicle includes a pipe 74, a valve 75, and a pump 76. The pipe 74 connects the tank 73 to the injection port 32a. The valve 75 is located midway in the pipe 74. The valve 75 and the pump 76 are controlled by a non-illustrated controller so that a predetermined amount of water is sprayed through the injection port 32a. That is, the water generated through power generation by the fuel cell 71 is supplied to the introduction chamber S2 through the injection port 32a.

Operation of the centrifugal compressor 10 of the present embodiment will now be described.

When the fuel cell vehicle starts traveling, the electric motor 12 is driven, the impeller 15 is rotated, and air is drawn in through the suction port 23a. Further, water supplied from the tank 73 is sprayed into the introduction chamber S2 through the injection port 32a. With this configuration, water generated through power generation by the fuel cell 71 is sprayed into the air flowing toward the impeller chamber S1 through the suction port 23a. The water sprayed through the injection port 32a is introduced into the impeller chamber S1 together with the air drawn in through the suction port 23a and cools the impeller 15. Thus, although the air introduced into the impeller chamber S1 is compressed by rotation of the impeller 15, the temperature of the impeller 15 is inhibited from increasing. The water sprayed through the injection port 32a also inhibits the temperature of air from being increased by compression.

The slight clearance C is provided between the blades 15d of the impeller 15 and the inner circumferential surface of the fitting portion 33. The clearance C is necessary for allowing the impeller 15 to rotate. In this case, the water sprayed through the injection port 32a seals the space between the blades 15d and the inner circumferential surface of the fitting portion 33. Thus, compressed air is inhibited from leaking through the clearance C between the blades 15d and the inner circumferential surface of the fitting portion 33.

When travelling of the fuel cell vehicle is finished, the electric motor 12 is stopped, and rotation of the impeller 15 is stopped. In this case, water that remains in the clearance C between the blades 15d and the inner circumferential surface of the fitting portion 33 is absorbed by the fitting portion 33 by capillary action. This removes the water that remains in the clearance C between the blades 15d and the inner circumferential surface of the fitting portion 33.

The above described embodiment has the following advantages.

(1) The centrifugal compressor 10 includes the injection port 32a for spraying water into the boss 32 of the housing 20. Water is sprayed through the injection port 32a. The water inhibits the temperature of air from increasing excessively. This configuration decreases the temperature of the air that is discharged from the centrifugal compressor 10. Thus, deterioration of the fuel cell 71 is inhibited.

(2) The water sprayed through the injection port 32a also cools the impeller 15. This inhibits the temperature of the impeller 15 from increasing excessively and inhibits deformation of the impeller 15.

(3) The water supplied to the impeller chamber S1 seals the clearance C between the blades 15d and the inner circumferential surface of the fitting portion 33. Thus, the compressed air is inhibited from leaking through the clearance C between the blades 15d and the inner circumferential surface of the fitting portion 33.

(4) The fitting portion 33 is made of porous material. Thus, although the electric motor 12 is stopped with water remaining in the clearance C between the blades 15d of the impeller 15 and the inner circumferential surface of the fitting portion 33, the water is absorbed by the fitting portion 33 by capillary action. This configuration prevents water from freezing in the clearance C and thus prevents the impeller 15 from being deformed at restarting of the centrifugal compressor 10.

(5) Since the entire fitting portion 33 is the porous portion, an annular porous portion that surrounds the impeller 15 is provided. This configuration prevents water from remaining in the entire circumference of the impeller 15.

(6) Water generated through power generation by the fuel cell 71 is used to cool the impeller 15. This configuration effectively uses the water obtained through power generation by the fuel cell 71.

The present embodiment may be modified as follows.

The injection port 32a, which opens in the introduction chamber S2, may be provided in the main body 31 of the compressor housing 23. In this case, the boss 32 of the compressor housing 23 may be omitted.

The number of the injection port 32a may be one or more.

The porous portion may be provided at part of the introduction passage defining wall (the main body 31). More specifically, the porous portion may be provided downstream of the injection port 32a in the flow direction of air flowing through the suction port 23a toward the impeller chamber S1. In this case, since some of water sprayed through the injection port 32a is absorbed by the introduction passage defining wall before reaching the impeller chamber S1, the water is inhibited from remaining in the clearance C between the blades 15d and the inner circumferential surface of the fitting portion 33.

The centrifugal compressor 10 may be mounted on an object other than the fuel cell vehicle.

Water generated in an air conditioning system of the fuel cell vehicle may be used as the water sprayed through the injection port 32a. A tank dedicated for storing water to be sprayed through the injection port 32a may be provided on the object on which the centrifugal compressor 10 is mounted.

What is claimed is:

1. A centrifugal compressor that supplies air to a fuel cell, the centrifugal compressor comprising:
    a shaft;
    an impeller including blades;
    a housing accommodating the impeller, the impeller being rotational integrally with the shaft; and
    a porous portion, wherein
    the housing includes:
        a suction port through which air is drawn in;
        an impeller chamber accommodating the impeller;
        an introduction chamber that connects the suction port to the impeller chamber and introduces air to the impeller chamber;
        a diffuser passage into which air that has been compressed by the impeller flows, the diffuser passage being located radially outward of the shaft from the impeller chamber; and
        a discharge chamber into which the air that has passed through the diffuser passage flows,
    the housing further includes:
        an introduction chamber defining portion that defines the introduction chamber; and
        an impeller chamber defining portion that defines the impeller chamber,
    the introduction chamber defining portion includes an injection port through which water is sprayed to air flowing through the suction port toward the impeller chamber,
    the impeller chamber defining portion includes a facing portion that faces the blades with a clearance located in between and an annular extended portion extending radially outward from the facing portion,
    the porous portion is provided in at least one of the facing portion and a part of the introduction chamber defining portion located downstream of the injection port in a flow direction of air flowing through the suction port toward the impeller chamber,
    the porous portion includes the annular extended portion of the impeller chamber defining portion, and the annular extended portion, as a whole, is porous, and
    the diffuser passage is defined by the porous annular extended portion between the impeller chamber and the discharge chamber.

2. The centrifugal compressor according to claim 1, wherein the porous portion has a loop shape.

3. The centrifugal compressor according to claim 1, wherein the water is generated through power generation by the fuel cell.

* * * * *